Patented June 9, 1925.

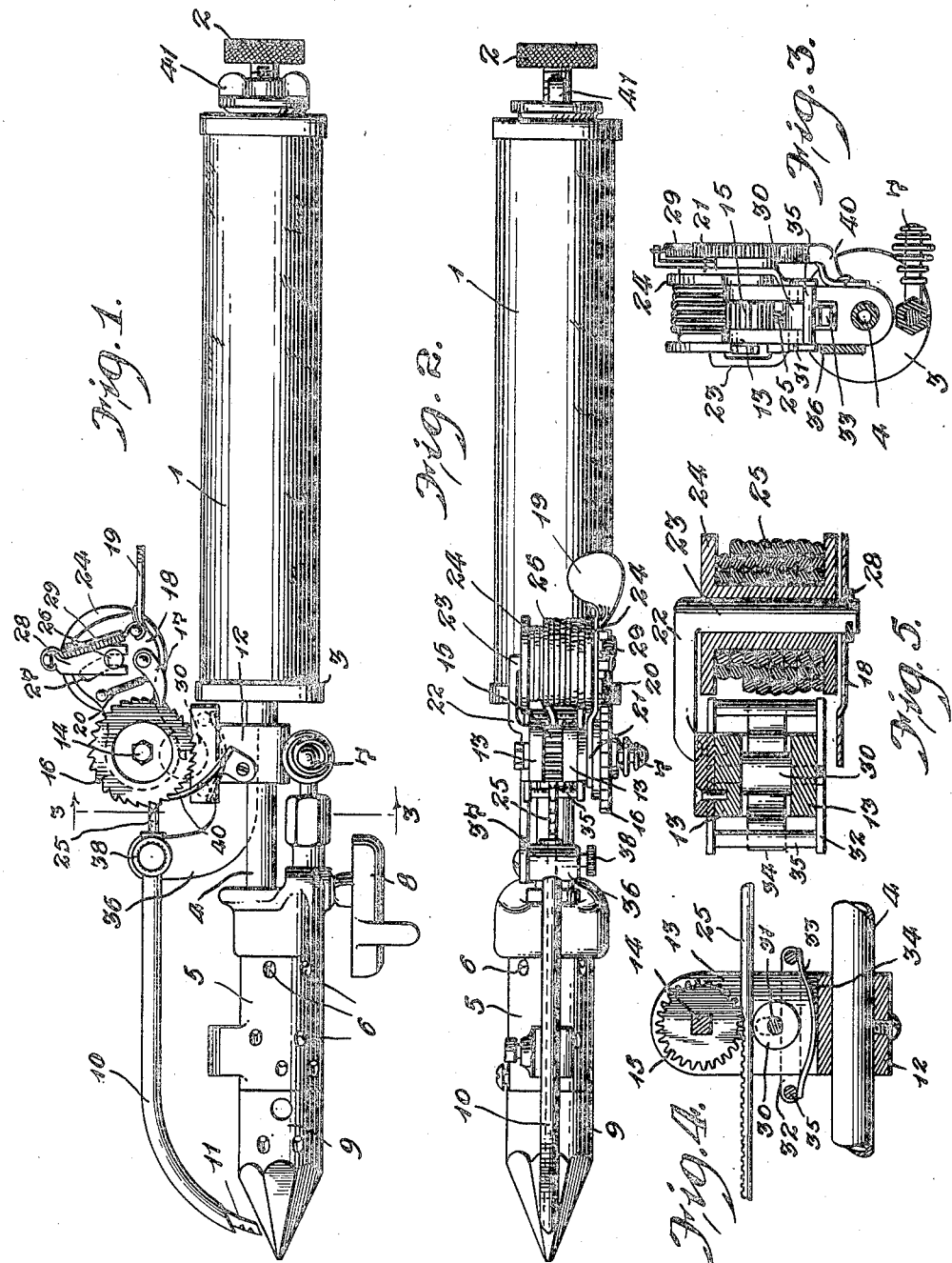

1,540,859

UNITED STATES PATENT OFFICE.

ANATOILE PLICQUE, OF NASHVILLE, TENNESSEE.

SOLDERING IRON.

Application filed June 24, 1924. Serial No. 722,171.

*To all whom it may concern:*

Be it known that I, ANATOILE PLICQUE, a citizen of the United States, and a resident of Nashville, in the county of Davidson and State of Tennessee, have invented certain new and useful Improvements in Soldering Irons, of which the following is a specification.

This invention relates to soldering irons and is more particularly directed to a feeding attachment for delivering a continuous stream of solder to the heated end of the iron.

An object of the invention is the provision of a device for supplying a stream of solder to the heated point of the solder-iron either in a continuous manner or as may be required by the needs of the work operated on.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a longitudinal side view of the soldering iron equipped with the feeding mechanism, Fig. 2 is a plan view of the same, Fig. 3 is a transverse vertical section taken along the line 3—3 of Fig. 1, Fig. 4 is a vertical longitudinal section of the feeding mechanism, and Fig. 5 is a horizontal section of said feeding mechanism.

In referring more particularly to the drawings, it must be borne in mind that the mechanism for heating the soldering iron is not concerned with the invention but rather with the feeding mechanism adapted to supply the solder in a continuous stream or periodically as may be desired to the heated points of the iron. 1 designates a pump cylinder adapted to be supplied with gasoline for providing a flame and which has a removable plunger 2 slidably mounted in the same for creating pressure on the liquid and forcing the same to the burner. The forward closed end 3 of the cylinder 1 is provided with an axial extension 4 adapted to carry the heating jacket 5 provided with a plurality of air openings 6. The extension 4, provided with a passage, places the burner within the jacket 5 in communication with the cylinder 1.

A valve 7 controls the flow of fuel to the burner and an auxiliary heating device 8 is carried by the casing 5 for heating the iron in advance of the lighting of the jet within the casing 5.

The outer pointed end 9 of the heating iron is provided with perforations which extend downwardly from the under face of the iron and away from a hollow guide 10 which carries a strip of solder 11, so that the solder will not be melted within the guide and prevent ready movement of the solder through the same.

Carried by the tubular member 4 is a cross-head 12 which is perforated to receive the rod 4 while a set-screw is adapted to lock the cross-head against movement on the tube 5. The upper end of the cross-head is bifurcated to form a pair of spaced arms 13 and is provided with bearings at its upper end to receive a shaft 14 carrying a toothed wheel 15, the toothed wheel being located between the upper ends of the arms 13. Locked to the ends of the shaft where the same projects beyond an arm 13 is a ratchet wheel 16 adapted to be engaged by a spring-pressed pawl 17 carried by an oscillating lever 18, said lever being provided with a finger-piece 19 adapted to be in a convenient position to be engaged by the thumb of the operator of the iron when the cylinder 1 is grasped by the hand.

A spring 20 maintains the pawl 17 in engagement with the teeth of the ratchet wheel 16. The lever 18 is pivotally mounted at 21 on the shaft 14 where the same projects beyond one arm 13 of the block 12.

A bracket arm 22 carrying a spindle 23 parallel to the shaft 14 is adapted to receive a spool 24 provided with a lead ribbon 25. The outer free end of the spindle 26 passes through an elongated slot 27 in the lever 18 and is provided with notches to receive the legs of a standard 28. A spring 29 engages a pin on the upper end of the standard 28 and a pin on the lever 18 for maintaining the lever in its most elevated position.

Below the shaft 14 is provided a roller 30 mounted in bearings in the arms 13 and adapted to maintain the ribbon of lead 25 in rigid engagement with the teeth of the wheel 15, so that when said wheel is rotated the teeth of said wheel will engage the ribbon 25 and force it forwardly through the tube 10 and in close association with the heated portion 9 of the soldering iron.

The ends of the shaft 31 of the roller 30 project through slots in the arms 13 and rest upon spring-pressed bearings 32 which are adapted to maintain the roller upwardly and in engagement with the ribbon 25. A spring 33 resting upon the shoulder 34 between the arms 13 of the block 12 is adapted to engage the cross-bars 35 secured to the bearings 32 for maintaining the bearings 32 in engagement with the ends of the shaft 31. A bracket arm 36 is secured to one side arm 13 of the cross-head 13 and extends forwardly and upwardly and has a perforated horizontal member 37 which is adapted to receive the feeding tube or guide 10 for the lead ribbon 11. A set-screw 38 is adapted to be screwed axially into the member 37 for engaging the tube 10 and locking the same in rigid position.

A spring 40 secured to the block 12 has its free end in engagement with the toothed wheel 16 and prevents said wheel from rotation. The tension of the spring 34 for forcing the roller 32 in engagement with the ribbon 25 is sufficient so that when the wheel 15 is operated the teeth of said wheel will make indentations in the ribbon of lead and force the same forwardly through the tubing 10.

The operation of my device is as follows:

Cylinder 1 is filled by the removal of the plug 41, and when the plug has been returned the plunger carried by the stem 2 is operated until sufficient air pressure is maintained to force the gasoline in the cylinder 1 through the burner. The valve 7 is operated to permit sufficient oil to fill the cap 8 and the gasoline is then lighted in this cap. When the burner is sufficiently heated the gasoline fuel is then turned on to the valve 7 and the burner then provides a blue flame with sufficient heat to maintain the end 9 of the iron hot for soldering. The lever 18 is operated through the thumb grip 19, and the ribbon of lead is slowly paid out between the gear wheel 15 and the roller 30, and this operation is continued until the work has been completed.

What I claim is:

1. In combination with a soldering iron and a feeding means for a ribbon of solder, comprising a bracket rigidly connected with the iron, a spool rotatably mounted on the bracket and carrying a ribbon of solder, a guide for directing the ribbon of solder to the heated point of the iron, a pair of arms carried by the bracket, a shaft mounted in the journals, a toothed wheel rigid with said shaft and adapted to engage the ribbon of solder, a tensioning means located below the toothed wheel and maintaining the ribbon of solder in engagement with the toothed wheel, a lever pivotally mounted on the shaft, a ratchet wheel rigid with the shaft, a pawl on the lever and engaging the ratchet wheel for causing rotation of said ratchet wheel when the lever is oscillated.

2. In combination with a soldering iron and a feeding means for a ribbon of solder, comprising a bracket rigidly connected with the iron, a spool rotatably mounted on the bracket and carrying a ribbon of solder, a guide for directing the ribbon of solder to the heated point of the iron, a pair of arms carried by the bracket, a shaft mounted in the journals, a toothed wheel rigid with said shaft and adapted to engage the ribbon of solder, a tensioning means located below the toothed wheel and maintaining the ribbon of solder in engagement with the toothed wheel, a lever pivotally mounted on the shaft, a ratchet wheel rigid with the shaft, a pawl on the lever and engaging the ratchet wheel for causing rotation of said ratchet wheel when the lever is oscillated, means engageable with the ratchet wheel for maintaining the ratchet wheel against reverse rotation, and means for adjusting the guiding means towards or away from the toothed wheel.

3. In combination with a soldering iron and a feeding means for a ribbon of solder, said feeding means comprising a bracket rigidly connected with the iron, said bracket being provided with a spindle, a spool rotatably mounted on the spindle, a guide for directing a ribbon of solder to the heated point of the iron, a pair of arms carried by the bracket, a shaft mounted in the journals, a toothed wheel adapted to engage the ribbon of solder, an operating lever provided with a pawl, a ratchet wheel rigid with the toothed wheel, the pawl being adapted to cause rotation of the ratchet wheel and toothed wheel when the lever is operated, said lever being provided with a slot, the end of the spindle projecting through said slot, and means supported from the projecting end of the spindle forming a spring support, and a spring connected between the free end of the last-mentioned means and the lever for maintaining said lever in a predetermined position.

ANATOILE PLICQUE.